Figure 3:
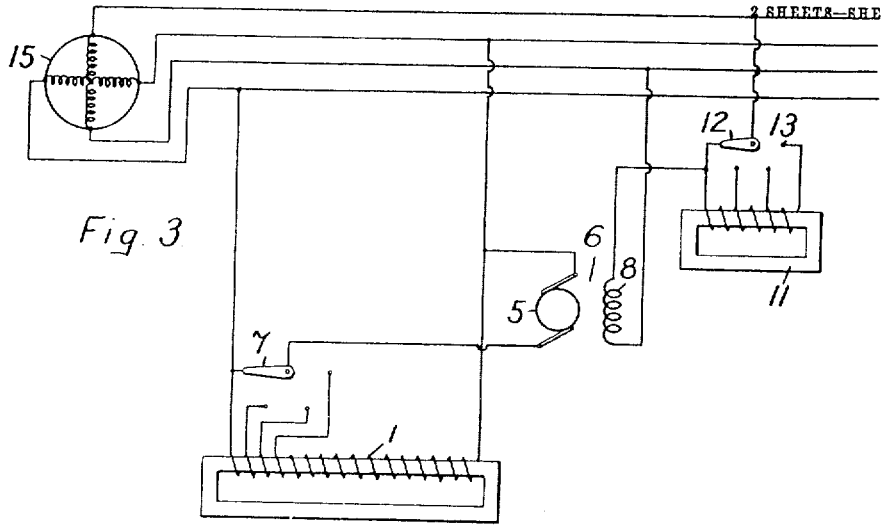

No. 839,937. PATENTED JAN. 1, 1907.
B. G. LAMME.
METHOD OF REGULATING THE SPEED OF ELECTRIC MOTORS.
APPLICATION FILED FEB. 6, 1905.

2 SHEETS—SHEET 2.

WITNESSES:
Fred. H. Miller
Otto S. Schairer

INVENTOR
Benj. G. Lamme
BY
Kirby G. Carr
ATTORNEY

No. 839,937. PATENTED JAN. 1, 1907.
B. G. LAMME.
METHOD OF REGULATING THE SPEED OF ELECTRIC MOTORS.
APPLICATION FILED FEB 6, 1905.

2 SHEETS—SHEET 1.

WITNESSES:
Fred H. Miller
Otto S. Schairer

INVENTOR
Benj. G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

METHOD OF REGULATING THE SPEED OF ELECTRIC MOTORS.

No. 839,937.

Specification of Letters Patent.

Patented Jan. 1, 1907.

Application filed February 6, 1905. Serial No. 244,477.

*To all whom it may concern:*

Be it known that I, BENJAMIN G. LAMME, a citizen of the United States, and a resident of Pittsburg, in the county of Allegheny and State of Pennsylvania, have invented new and useful Improvements in Methods of Regulating the Speed of Electric Motors, of which the following is a specification.

My invention relates to alternating-current motors of the commutator type of construction; and its object is to provide an improved method of regulating the speed of such motors.

In general motors of the commutator type of construction, if properly designed, may be operated efficiently by means of alternating currents, provided the currents in the armature and field-magnet windings reverse simultaneously, or nearly so. If the armature and field circuits of a motor of the commutator type having laminated magnetic circuits are supplied with alternating electromotive forces differing ninety degrees in phase, the currents in the armature and field-magnet windings may reverse nearly simultaneously. This is true because the current supplied to the field-magnet winding may be largely a magnetizing or wattless current that lags nearly ninety degrees behind the electromotive force impressed upon that circuit, while the armature-circuit may be, and is ordinarily, made with but little self-induction, so that the current in this circuit lags but little behind the electromotive force impressed upon it. It is obvious, then, that if the electromotive forces applied to the two circuits differ ninety degrees in phase the currents in the armature and field-magnet circuits differ but little in phase. It has been found in practice, however, that in order to obtain minimum armature-current for a given torque with such a motor it is necessary that the currents in the armature and field circuits be more nearly coincident in phase than is the case if only the differences of the power factors of the circuits are depended upon to produce the proper phase relations. The insufficiency of the power-factor conditions of the circuits is partially due to the fact that the armature-circuit cannot be made entirely non-inductive. Moreover, when constant voltages are applied to the armature and field-magnet windings the amount of current in the field-magnet winding, as well as its phase relation with respect to the electromotive force applied to the winding, remains practically constant even under variations in the load upon the motor; but the amount of current in the armature-circuit varies according to the work which the motor is doing and the phase relations of this current with respect to the electromotive force applied to the armature-winding varies as the amount of current varies. Thus the phase relations of the currents in the armature and field-magnet windings with respect to each other vary as the work done by the motor varies. With no load on the motor—*i. e.,* with but small currents flowing in the armature-circuit—the phase relations may be reasonably close to the desired relations; but as load is placed on the motor the phase relations with respect to each other of the armature and field currents change.

The proper adjustment of the phase relations of the armature and field currents in order to obtain minimum armature-current for a given torque regardless of the load upon the motor may be effected either by varying the phase relation of the field electromotive force with respect to the armature electromotive force in accordance with changes in load or by altering the phase relations of the current and electromotive force in the armature-winding or in the field-magnet windings, or in both, a method and means for effecting these adjustments being described in application, Serial No. 244,481, filed by Clarence Renshaw, application, Serial No. 244,482, filed jointly by Clarence Renshaw and myself, and applications, Serial Nos. 244,475 and 244,476, filed by me, all of even date herewith.

After the best average phase relation of the currents in the armature and field-magnet windings has been obtained for a given torque it is desirable that these conditions be not disturbed in adjusting the speed of the motor over any desired range. It is the purpose of this invention to provide a method of varying the speed of motors of the type described without disturbing the phase relations of the currents in the armature and field-magnet windings—*i. e.,* without affecting the power factor of the motor.

Figure 4:
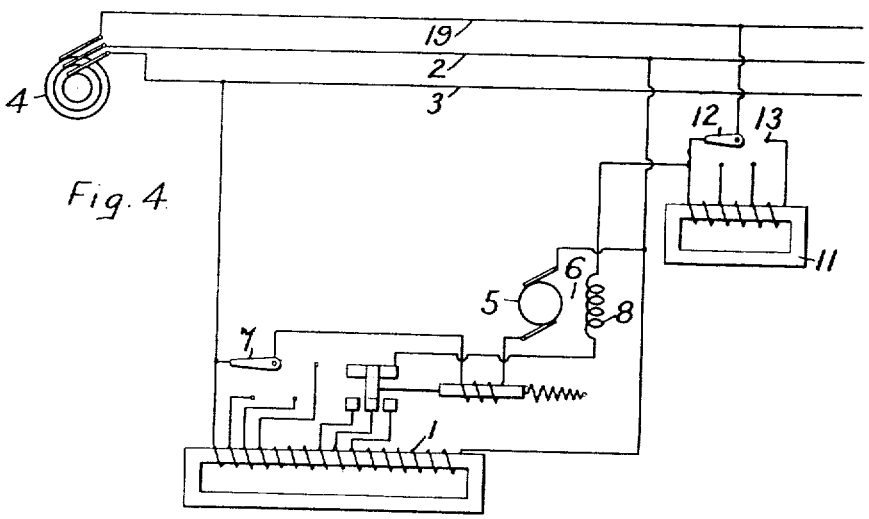
Figure 1:
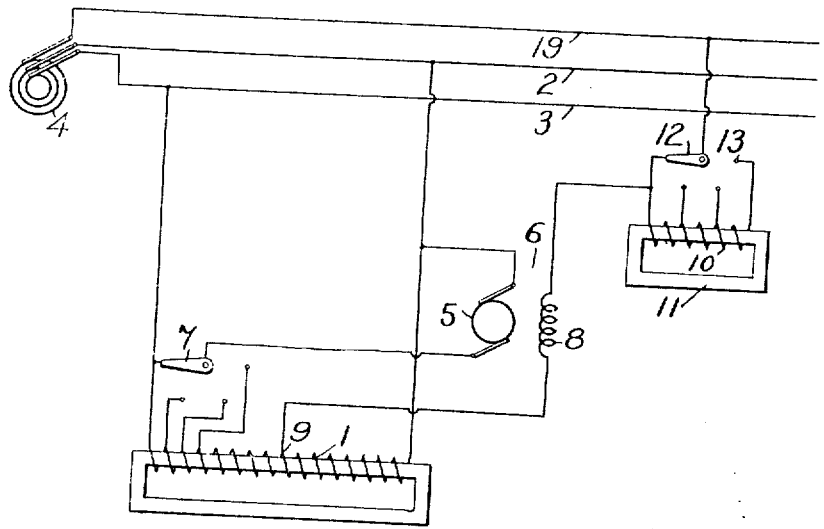
Figure 2:
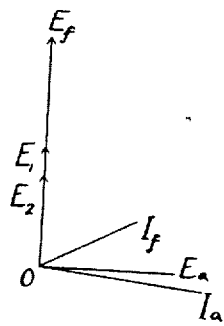

My invention is illustrated in the accompanying drawings, Figure 1 of which is a diagrammatic view of a motor that is provided with means for practicing my invention as employed in connection with a three-phase system. Fig. 2 is a vector diagram of the approximate phase relations as they may occur in a motor provided with means for practicing my invention. Fig. 3 is a diagrammatic view of my invention as employed in connection with a two-phase system, and Fig. 4 is a diagrammatic view of a modification of the system illustrated in Fig. 1.

An autotransformer-winding 1 is connected between distributing-conductors 2 and 3 from a suitable source of three-phase energy 4, and armature-winding 5 of a motor 6 derives energy from the autotransformer-winding 1, any suitable means, such as that shown at 7, being provided for the purpose of varying the electromotive force applied to the armature-winding. One terminal of the field-magnet winding 8 of the motor 6 is connected to approximately the middle point 9 of the transformer-winding 1, and the other terminal is connected to one terminal of the winding 10 of an impedance device 11, which is provided with any suitable means for varying its active length, such as a movable contact-arm 12 and stationary terminals 13, that are respectively connected to points in the inductive winding 10, the arm 12 being connected to distributing-conductor 19. With this arrangement the electromotive force applied to the field-circuit is substantially .867 of the potential difference existing between any two of the supply-conductors, and these electromotive forces differ in phase by approximately ninety degrees. A variation or a deviation from exact quadrature relation may be obtained by shifting the point of connection of the terminal of the field-magnet winding to the autotransformer-winding.

If the impedance device 11 is so designed that its power factor—i. e., the phase relation between the current and the electromotive force supplied to it—remains approximately constant and equal to the power factor of the field-magnet winding as the amount of impedance is varied, then the speed of the motor may be varied without varying the phase relations with respect to each other of the currents in the armature and field-magnet windings—i. e., without varying the power factor of the motor. These conditions may be better understood from a consideration of the vector diagram of Fig. 2, in which lines $OE_a$ and $OI_a$ respectively represent in direction the electromotive force applied to and the current in the armature-circuit, and lines $OE_f$ and $OI_f$ respectively represent in direction the electromotive force applied to and the current in the field-circuit. The electromotive force $OE_f$, that is applied to the field-circuit is the resultant of two electromotive forces $OE_1$ and $OE_2$, that are impressed, respectively, upon the field-magnet winding 8 and the impedance device 11. It is evident that if the phase relation of the current to the electromotive force in the impedance device is approximately the same as the corresponding relation in the field-magnet winding the resultant electromotive force $OE_f$ is equal to the arithmetical sum of the two component electromotive forces $OE_1$ and $OE_2$, and consequently a variation in the values of the component electromotive forces does not effect a variation in the phase relations of the currents $OI_f$ and $OI_a$ in the field-magnet and armature windings, respectively. If, however, the power factors of the field-magnet winding and the impedance device differ, the resultant electromotive force $OE_f$ is the geometrical sum of the two component electromotive forces $OE_1$ and $OE_2$, which differ in phase, and a variation in the amount of the impedance which is included in the field-circuit will vary the phase relations of the electromotive force $OE_f$ applied to the field-circuit and the current $OI_f$ in that circuit. This results in a variation of the phase relations of the currents $OI_f$ and $OI_a$ in the field-magnet and armature windings, respectively—i. e., a variation in the power factor of the motor.

In the modification of my invention shown in Fig. 3 the armature 5 of the motor 6 derives its energy, as before, from an autotransformer-winding 1, which is supplied with energy from one phase of a suitable two-phase source 15. Field-magnet winding 8 derives its energy from the other phase of the two-phase source, and the amount of current traversing this winding is governed by means of an adjustable impedance device 11, which maintains throughout its adjustments a constant power factor approximately equal to that of the field-magnet winding 8.

It is of course understood that the autotransformer 1 (illustrated in Figs. 1 and 3) may be replaced by a two-winding transformer, from the secondary of which the armature-winding may derive its energy. In the system shown in Fig. 1 one terminal of the field-magnet winding 8 would in case of the employment of a two-winding transformer be connected to the middle point of the secondary winding.

In Fig. 4 I have shown my invention employed in a three-phase system in combination with automatic means for varying the phase relations of the currents in the field-magnet and armature windings of a motor of the type described for the purpose of obtaining minimum armature-current for a given torque, similar means being described in applications, Serial Nos. 244,475 and 244,476, filed by me of even date herewith.

Variations in the details of construction and the arrangement of the means here shown for practicing my invention may be adopted without substantially altering the method.

I claim as my invention—

1. The method of regulating the speed of an alternating-current motor having armature and field-magnet windings upon which electromotive forces differing in phase are impressed respectively, which consists in varying the electromotive force applied to the terminals of the field-magnet winding by varying the impedance of the field-circuit.

2. The method of regulating the speed of an alternating-current motor having armature and field-magnet windings upon which electromotive forces differing in phase are impressed respectively, which consists in varying the amount of impedance of the circuit of the field-magnet winding.

3. The method of regulating the speed of an alternating-current motor having armature and field-magnet windings upon which electromotive forces differing in phase are impressed respectively, which consists in varying the amount of impedance in circuit with the field-magnet winding, the impedance having a power factor that is approximately constant and equal to that of the field-magnet winding.

4. The method of regulating the speed of an alternating-current motor having armature and field-magnet windings upon which electromotive forces differing in phase are impressed respectively, which consists in varying the amount of impedance in circuit with the field-magnet winding, the electromotive forces and currents in the impedance always being approximately in phase with those in the field-magnet winding.

5. The method of regulating the speed of an alternating-current motor having armature and field-magnet windings upon which electromotive forces differing in phase are impressed respectively, which consists in varying the amount of impedance in circuit with the field-magnet winding without varying in a substantial degree the phase relations of the current in the circuit to the electromotive force applied thereto.

6. The method of regulating the speed of an alternating-current motor having armature and field-magnet windings upon which electromotive forces differing in phase are impressed respectively, which consists in varying the amount of impedance in one of the motor-circuits, the impedance having a power factor that remains approximately constant and equal to that of the motor-winding that is in the same circuit.

7. The method of regulating the speed of an alternating-current motor having armature and field-magnet windings upon which electromotive forces differing in phase are impressed respectively, which consists in varying the amount of impedance in one of the motor-circuits, the electromotive forces and currents of the impedance always remaining approximately in phase with those of the motor-winding that is in the same circuit.

8. The method of regulating the speed of an alternating-current motor having armature and field-magnet windings upon which electromotive forces differing in phase are impressed respectively, which consists in varying the amount of impedance in one of the motor-circuits without varying in a substantial degree the phase relations of the current in the circuit to the electromotive force applied thereto.

9. The method of regulating the operation of a dynamo-electric machine having field-magnet and armature windings which consists in varying the amount of impedance in circuit with one of the windings, the impedance having a power factor that remains substantially constant and equal to that of the winding in circuit with which it is connected.

10. The method of regulating the operation of a dynamo-electric machine having field-magnet and armature windings which consists in varying the amount of impedance in circuit with the field-magnet winding, the impedance having a power factor that remains substantially constant and equal to that of the winding in circuit with which it is connected.

In testimony whereof I have hereunto subscribed my name this 3d day of February, 1905.

BENJ. G. LAMME.

Witnesses:
OTTO S. SCHAIRER,
BIRNEY HINES.